United States Patent Office 2,816,102
Patented Dec. 10, 1957

2,816,102

METALLIFEROUS AZO DYESTUFFS

Henri Riat, Arlesheim, and Oscar Weber, Reinach, Switzerland, assignors to Ciba Limited, Basel, Switzerland, a Swiss firm No Drawing. Application February 5, 1954,
Serial No. 408,594

Claims priority, application Switzerland
February 12, 1953

8 Claims. (Cl. 260—148)

This invention provides new metalliferous azo dyestuffs which correspond to the general formula (1) 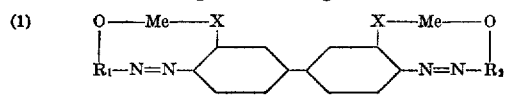

in which Me represents nickel or copper, X represents an oxygen atom or the group —COO— or

—OCH$_2$COO—

R$_1$—O— and R$_2$—O— each represent the radical of a hydroxynaphthalene monosulfonic acid bound to the azo linkage in ortho-position relatively to the hydroxyl group, and in which at least one of the latter radicals contains as a further substituent a YO—O$_2$S—O— alkylamino group, for example, a group of the formula

YO—O$_2$S—O—CH$_2$CH$_2$NH— in which Y represents a cation.

The invention also includes a process for making the metalliferous dyestuffs of the Formula 1, wherein a disazo-dyestuff containing ester groups and corresponding to the general formula (2) 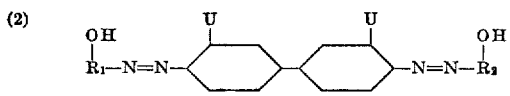

in which U represents a hydroxyl, carboxyl or carboxy methoxy group or the radical YO—O$_2$S—O—, in which Y represents a cation, and the radicals R$_1$ and R$_2$ have the meanings given above, is treated with an agent yielding nickel or copper.

As agents yielding nickel or copper there are advantageously used salts of divalent nickel or divalent copper such as nickel sulfate or cupric sulfate, and also compounds which contain these metals in complex union. Nickel- or copper-amine complexes are especially suitable for this purpose such, for example, as the complex nickel or copper compounds obtainable from ammonia, alkyl amines such as ethylamine, morpholine, ethanolamine, pyridine, picolines or piperidine.

The disazo-dyestuffs of the Formula 2 containing ester groups, which are to be treated with the agent yielding nickel or copper, can be obtained, for example, by coupling a tetrazotized diamine of the formula (3) 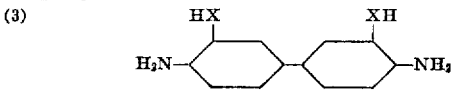

in which —XH represents a hydroxyl, carboxyl or carboxy methoxy group, on both sides with hydroxynaphthalene sulfonic acids capable of coupling in ortho-position relatively to the hydroxyl group, at least one of which hydroxynaphthalene sulfonic acids contains as a further substituent an hydroxyalkylamino group, for example, a hydroxyethylamino group, and introducing an acid sulfuric acid ester group into the aliphatically bound hydroxyl group of the resulting disazo dyestuff.

As diamines of the Formula 3 there come into consideration 3:3'-dihydroxy-4:4'-diaminodiphenyl, 4:4'-diaminodiphenyl-3:3'-dicarboxylic acid and 3:3'-di-(carbomethoxy)-4:4'-diaminodiphenyl.

As hydroxynaphthalene sulfonic acids containing hydroxyalkylamino groups there are advantageously used those in which the alkyl radical is of low molecular weight, for example, a butyl, propyl or ethyl group. Furthermore, two hydroxyalkyl groups may be bound to the same nitrogen atom. The introduction of the hydroxyalkyl groups is advantageously carried out by methods in themselves known, for example, by reacting the amino group of the amino-hydroxynaphthalene sulfonic acid with a hydroxy-halogen-alkylene such as epichlorhydrin, glycerine chlorhydrin or α-chloro-γ-hydroxypropane. Especially advantageous is α-chloro-β-hydroxyethane (glycol chlorhydrin, ethylene chlorhydrin). Furthermore, certain amino-hydroxynaphthalene sulfonic acids may be condensed with amino-hydroxyalkyl compounds, such as ethanolamine, with the aid of alkali bisulfites.

Especially valuable are the hydroxynaphthalene sulfonic acids of the formula (4) 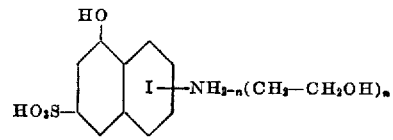

in which $n$ represents a whole number not greater than 2, and the group —NH$_{2-n}$(CH$_2$—CH$_2$OH)$_n$ occupies a β-position of the 6-membered ring I.

All the following hydroxynaphthalene sulfonic acids yield valuable dyestuffs:

2-(β-hydroxyethyl) - amino - 8 - hydroxynaphthalene - 6-sulfonic acid, 2-(di-β-hydroxyethyl)-amino-8 - hydroxynaphthalene - 6-sulfonic acid, 2-(β - hydroxyethyl) - amino - 5 - hydroxynaphthalene-7-sulfonic acid, 2-(di-β-hydroxyethyl) - amino-5-hydroxynaphthalene - 7-sulfonic acid, 2-(β-hydroxypropyl) - amino - 5 - hydroxynaphthalene-7-sulfonic acid, 2-(γ-hydroxypropyl) - amino - 5 - hydroxynaphthalene-7-sulfonic acid, 2-(δ-hydroxybutyl) - amino - 5-hydroxynaphthalene - 7-sulfonic acid and 2-(β:γ-dihydroxypropylamino) - 5 - hydroxynaphthalene-7-sulfonic acid.

The hydroxynaphthalene sulfonic acid containing no hydroxy-ethylamino group and which may, if desired, be used as a second coupling component may be chosen as desired. It may, of course, contain further substituents, for example, a further hydroxyl group or an amino, alkylamino, arylamino or acylamino group. As examples there may be mentioned the following compounds:

1-hydroxynaphthalene-4-sulfonic acid, 2-hydroxynaphthalene-4- or -6-sulfonic acid, 2-amino-, 2-phenylamino-, 2-acetylamino- or 2-benzoylamino-5-hydroxynaphthalene-7-sulfonic acid, or 2-amino-8-hydroxynaphthalene-6-sulfonic acid.

Conversion of the aliphatically bound hydroxyl groups in the azo dyestuffs into acid sulfuric acid ester groups is usually carried out with advantage by the action of chlorosulfonic acid in the presence of a tertiary base, for example, a pyridine base such as picoline or pyridine itself. The dyestuffs to be esterified also contain aromatically bound hydroxyl groups, and in general no disadvantage arises if these groups are also esterified. In the case of hydroxyl groups which take part in a subsequent metallization and yield ortho:ortho'-dihydroxy-azo-metal complexes, the sulfuric acid ester groups are easily split off in the treatment with the agent yielding metal. The esterification may also be carried out in concentrated sulfuric acid, in which case the aromatic hydroxyl groups are usually not esterified.

As will be understood from the foregoing description, there are of special interest those metalliferous dyestuffs obtainable by the present process, which correspond to the formula (5) 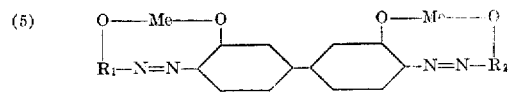

in which Me represents the metal nickel or copper, and $R_1$—O— and $R_2$—O— each represent the radical of a hydroxynaphthalene mono sulfonic acid bound to the azo linkage in ortho-position relatively to the —O—Me group, and in which at least one of the latter radicals contains as a further substituent a YO—$O_2$S—O— alkylamino group, in which Y represents a cation.

The formulae of the metalliferous dyestuffs given herein undoubtedly represent the correct stoichiometric proportions of metal and the correct position of the metal atoms in the complex. However, the distribution of main and secondary valencies in the complex union of the metal has not been established with certainty.

The new metalliferous dyestuffs of the Formula 1 are suitable for dyeing and printing a very wide variety of materials, above all cellulose-containing fibers such as linen, cotton or artificial silk and staple fibers of regenerated cellulose. The dyestuffs are distinguished by their good absorption capacity and also by their good levelling properties, and yield interesting tints of good fastness to light which are in some cases very pure, the fastness to light being maintained after the usual anticreasing treatments.

The following examples illustrate the invention, the parts and percentages being by weight:

Example 1

18 parts of chlorosulfonic acid are introduced dropwise, while cooling, into 70 parts of pyridine. Into the resulting mixture there are introduced at 30–40° C., while stirring well, 18 parts of the pulverized disazodyestuff obtainable by coupling 1 mol of tetrazotized 3:3'-dihydroxy-4:4'-diaminodiphenyl in an alkaline medium with 2 mols of 2-(di-β-hydroxyethyl)-amino-5-hydroxynaphthalene-7-sulfonic acid, and the whole is stirred for one hour at 40° C. and for a further 2 hours at 50–55° C. The thickly liquid blue solution is diluted with a small amount of water, then rendered alkaline with sodium carbonate, the pyridine is distilled off under reduced pressure, and the dyestuff is salted out and filtered off.

In order to convert the dyestuff into its complex copper compound the paste is dissolved in 300 parts of warm water and mixed at 70° C. with ammoniacal solution of copper sulfate (corresponding to 10 parts of $CuSO_4.5H_2O$). The mixture is maintained at 70° C. for a few minutes, then saturated with sodium chloride and allowed to cool, whereupon the dyestuff precipitates completely in the course of several hours. The dyestuff is filtered off and dried in vacuo. It dissolves very easily in water with a blue coloration and dyes cotton very pure blue tints. The dyeing has an excellent fastness to light.

By using as starting material 16 parts of the disazodyestuff obtained by coupling tetrazotized 3:3'-dihydroxy-4:4'-diaminodiphenyl with 2-(β-hydroxyethyl)-amino - 8-hydroxynaphthalene-6-sulfonic acid, and otherwise proceeding as described in this example, there is obtained a dyestuff which is likewise easily soluble and dyes cotton grey-blue tints which are very fast to light.

Example 2

18 parts of the finely pulverized dyestuff from 1 mol of tetrazotized 3:3'-dihydroxy-4:4'-diaminodiphenyl and 2 mols of 2-(di-β-hydroxyethylamino)-5-hydroxynaphtalene-7-sulfonic acid (see Example 1) are introduced into 150 parts of concentrated sulfuric acid, the temperature being maintained at about 30° C. by external cooling. After 2 hours the mixture is poured into ice water and saturated with sodium chloride. The dyestuff is filtered off after a few hours, washed with saturated sodium chloride solution, and converted by the method described in Example 1 into its copper complex which has approximately the same properties as the dyestuff described in the second paragraph of Example 1.

Dyestuffs having similar properties are obtained by the procedure described in this example, but by using as starting materials the disazo-dyestuffs set out in the following table. These dyestuffs are obtained by coupling 1 mol of the tetrazo-compound of the diamine named in column I with 2 mols of the coupling components given in column II:

| I<br>Diazo-component | II<br>Coupling components |
|---|---|
| 1...... 3:3'-dihydroxy-4:4'-diamino-diphenyl. | 2-(β-hydroxyethyl)-amino-5-hydroxy-naphthalene-7-sulfonic acid. |
| 2...... ......do...... | 2-(β-hydroxypropyl)-amino-5-hydroxynaphthalene-7-sulfonic acid. |
| 3...... ......do...... | 2-(γ-hydroxypropyl)-amino-5-hydroxynaphthalene-7-sulfonic acid. |
| 4...... ......do...... | 2-(δ-hydroxybutyl)-amino-5-hydroxy-naphthalene-7-sulfonic acid. |
| 5...... ......do...... | 2-(β:γ-dihydroxypropyl)-amino-5-hydroxynaphthalene-7-sulfonic acid. |

Finally, by using the dyestuff obtained by coupling 3:3'-dihydroxy-4:4'-diaminodiphenyl with 1-(β-hydroxyethyl)-amino-8-hydroxynaphthalene-4-sulfonic acid, there is obtained a copper complex which dyes cotton green-blue tints.

By treating the esterified dyestuffs in the manner described above with nickel sulfate, instead of copper sulfate, there are obtained easily soluble nickel complexes which dye cotton reddish blue tints of very good fastness to light.

Example 3

10 parts of the finely pulverized dyestuff from 1 mol of 4:4'-diaminodiphenyl-3:3'-dicarboxylic acid and 2 mols of 2-(β-hydroxyethyl)-amino - 5 - hydroxynaphthalene-7-sulfonic acid are dissolved in 100 parts of concentrated sulfuric acid. After one hour the solution is poured into ice water. The dyestuff is precipitated with sodium chloride and then converted into its copper complex by means of an ammoniacal solution of copper sulfate. The copper complex dissolves in water with a red-blue coloration and dyes cotton blue-violet tints.

By using, instead of the dyestuff described above, the disazo-dyestuff obtained by coupling diazotized 3:3'-di-(carboxy-methoxy)-4:4'-diaminodiphenyl with 2-(di-β-hydroxyethyl)-amino-5-hydroxynaphthalene - 7 - sulfonic acid, there is obtained a dyestuff which yields reddish blue tints on cotton.

Example 4

100 parts of cotton are entered at 40° C. into a dyebath which contains in 3000 parts of water 0.7 part of the cupriferous azo dyestuff obtainable as described in the second paragraph of Example 1. Dyeing is carried on for one hour during which the temperature is raised to 90° C., 30 parts of crystalline sodium sulfate are added and dyeing is continued for a further ½ hour at 90–95° C. The cotton is then rinsed in the cold and finished in the usual manner. It is dyed a very pure blue tint, and the dyeing is distinguished by its excellent fastness to light.

What is claimed is:
1. A metalliferous azo dyestuff which in its free acid state corresponds to the formula

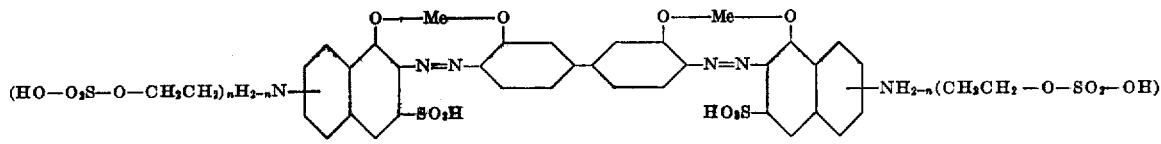

state corresponds to the formula

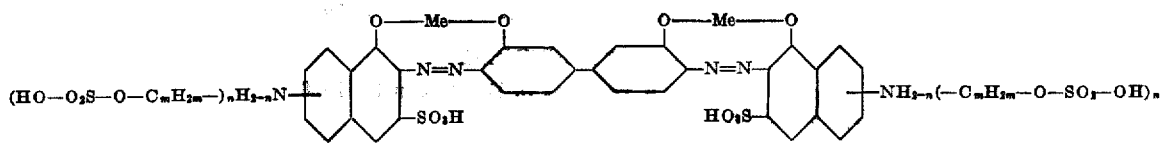

in which Me represents a metal atom having an atomic number of at least 28 and at the most 29, $m$ represents a whole number from 2 to 4, $n$ represents a whole number of at the most 2 and the substituents $$-NH_{2-n}(-C_mH_{2m}-O-SO_2-OH)_n$$

occupy $\beta$-positions of the naphthalene nuclei.

2. A metalliferous azo dyestuff which in its free acid state corresponds to the formula in which Me represents a metal atom having an atomic number of at least 28 and at the most 29, $n$ is a whole number of at the most 2 and the substituents $$-NH_{2-n}(-CH_2CH_2-O-SO_2-OH)_n$$

occupy $\beta$-positions of the naphthalene nuclei.

3. A cupriferous azo dyestuff which in its free acid state corresponds to the formula

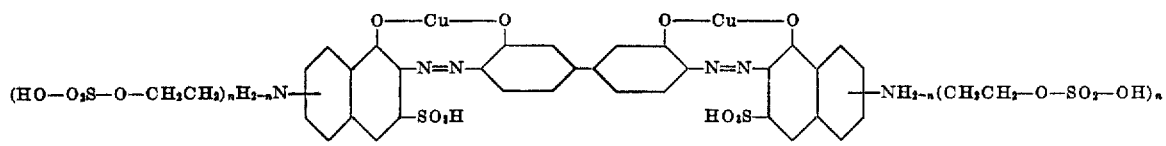

wherein $n$ is a whole number of at the most 2, and the substituents $-NH_{2-n}(CH_2CH_2-O-SO_2-OH)_n$ occupy $\beta$-positions of the naphthalene nuclei.

4. The cupriferous azo dyestuff of the formula

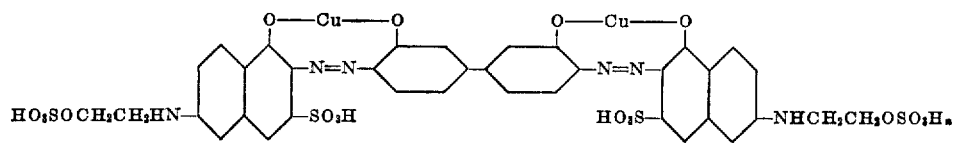

5. The cupriferous azo dyestuff of the formula

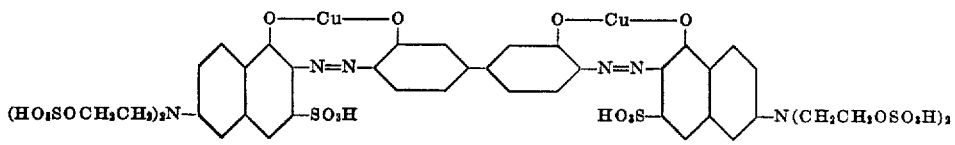

6. The cupriferous azo dyestuff of the formula

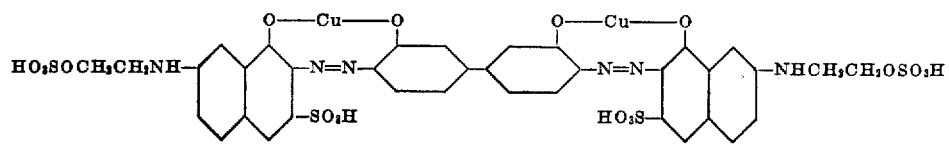

7. The cupriferous azo dyestuff of the formula

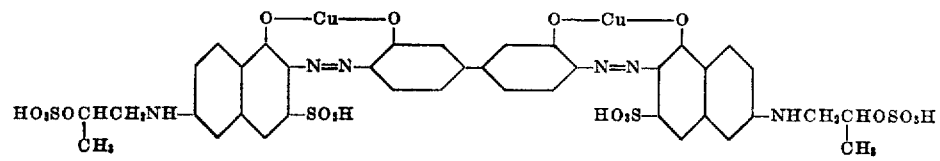

8. The cupriferous azo dyestuff of the formula
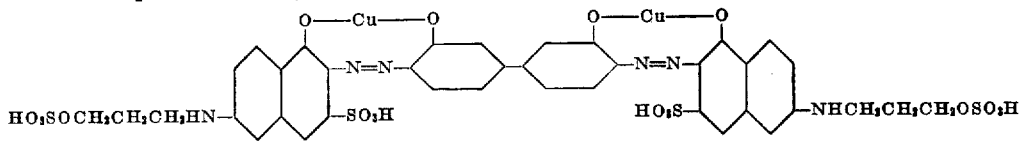
References Cited in the file of this patent
FOREIGN PATENTS
| | | |
|---|---|---|
| 333,573 | Great Britain | Aug. 11, 1930 |
| 553,045 | Germany | June 21, 1932 |
| 236,934 | Switzerland | July 16, 1945 |
| 236,937 | Switzerland | July 16, 1945 |
| 276,905 | Switzerland | Nov. 1, 1951 |
OTHER REFERENCES
Georgievics et al.: A Textbook of Dye Chemistry 1920 (pp. 6 and 7).

U. S. DEPARTMENT OF COMMERCE
PATENT OFFICE

CERTIFICATE OF CORRECTION

Patent No. 2,816,102

December 10, 1957

Henri Riat et al.

It is hereby certified that error appears in the printed specification of the above numbered patent requiring correction and that the said Letters Patent should read as corrected below.

Column 6, claim 4, for the lower right-hand portion of the formula reading "-NHCH$_2$CH$_2$OSO$_3$H$_n$" read -- -NHCH$_2$CH$_2$OSO$_3$H --.

Signed and sealed this 6th day of May 1958.

(SEAL)
Attest:

KARL H. AXLINE
Attesting Officer

ROBERT C. WATSON
Commissioner of Patents